(No Model.) 3 Sheets—Sheet 1.
H. MORRISON.
CORN HARVESTER.
No. 482,186. Patented Sept. 6, 1892.
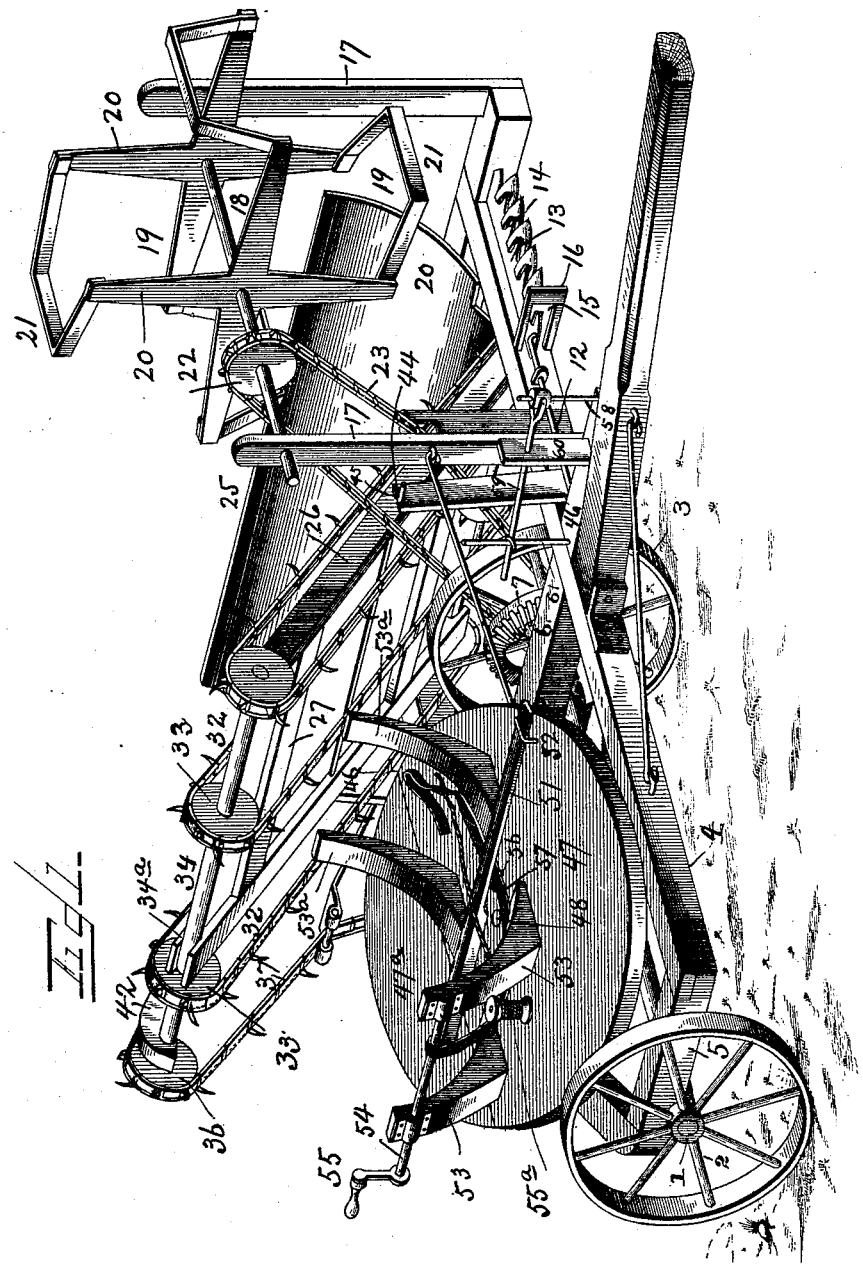
WITNESSES:
INVENTOR:

(No Model.) 3 Sheets—Sheet 2.
H. MORRISON.
CORN HARVESTER.
No. 482,186. Patented Sept. 6, 1892.
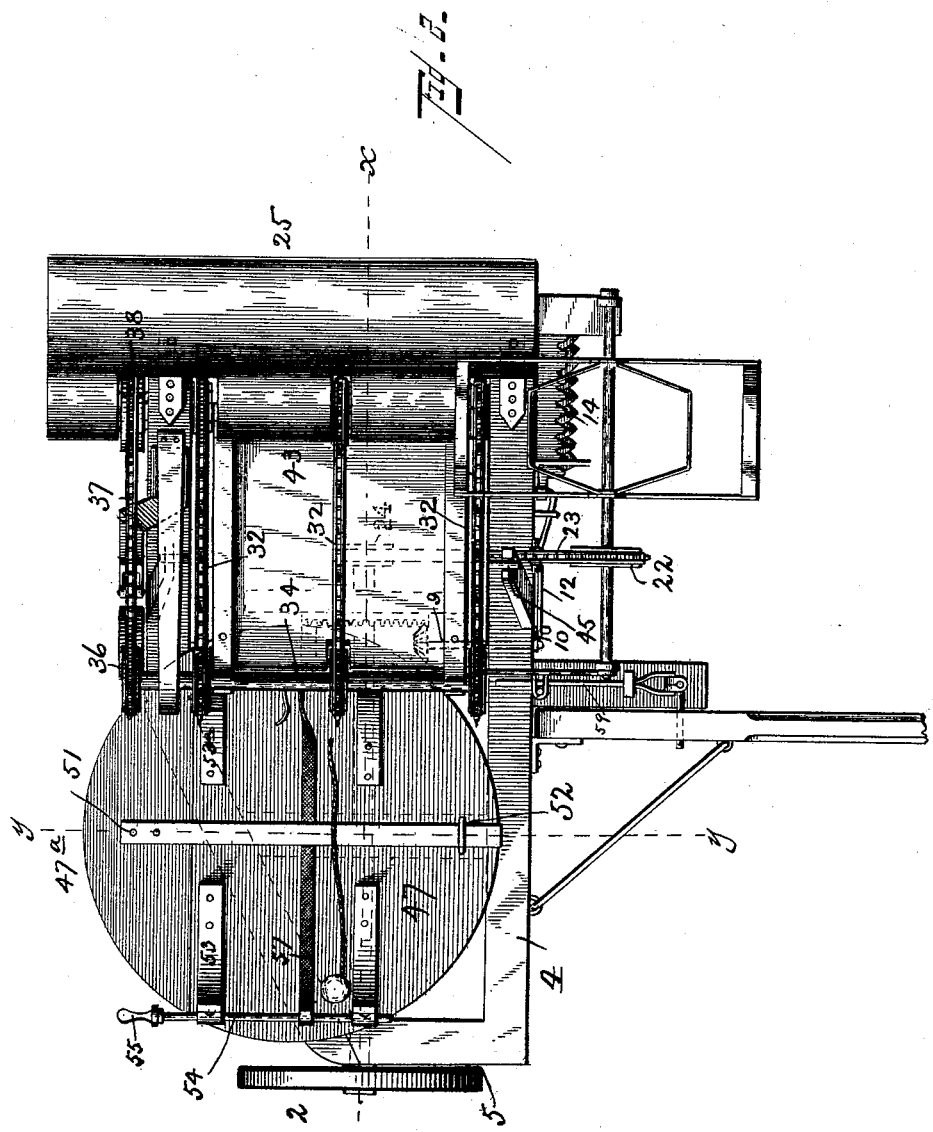
WITNESSES:
INVENTOR:
Hamon Morrison (No Model.) 3 Sheets—Sheet 3.
H. MORRISON.
CORN HARVESTER.
No. 482,186. Patented Sept. 6, 1892.
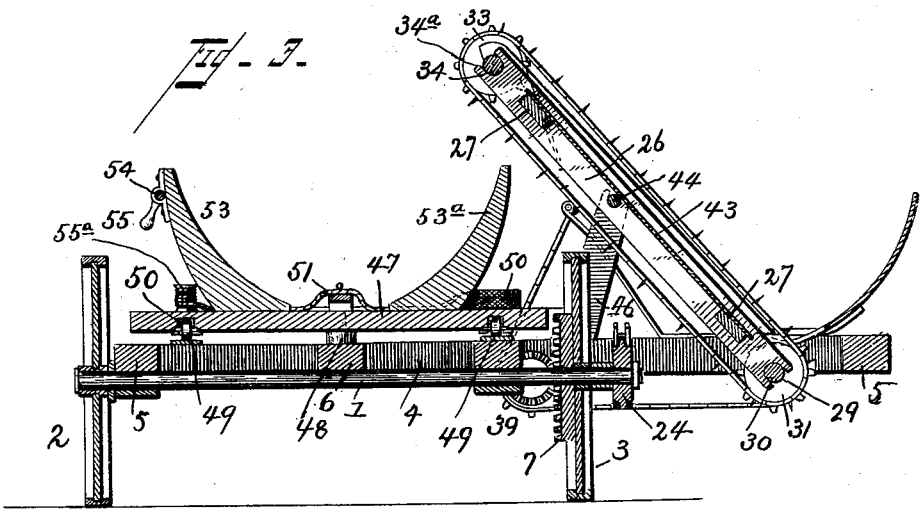
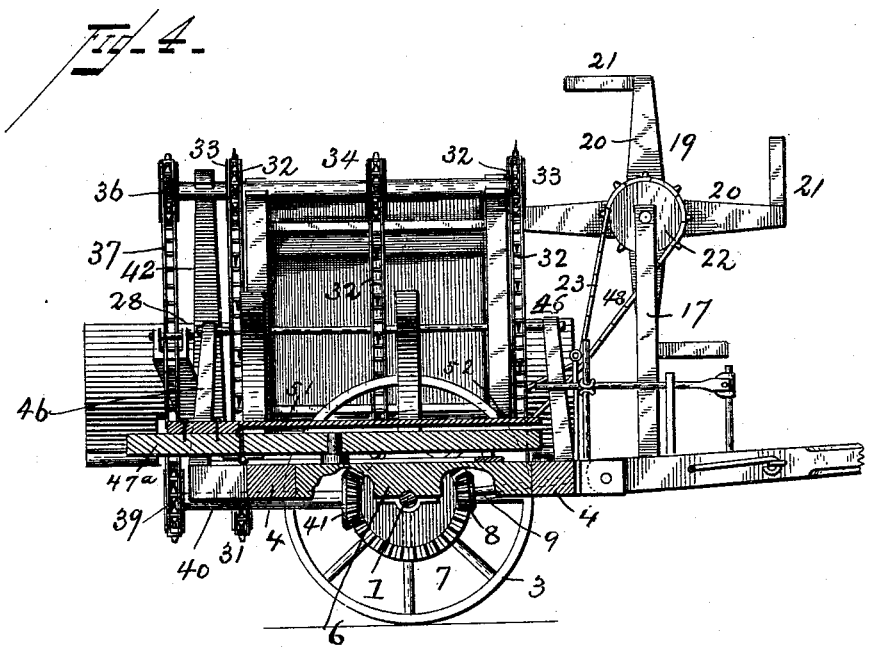
WITNESSES:
INVENTOR:
Hamon Morrison,

UNITED STATES PATENT OFFICE.

HAMON MORRISON, OF MORANTOWN, KANSAS, ASSIGNOR OF ONE-HALF TO GREENLEAF W. CAMPBELL AND JOHN H. VAUGHN, OF SAME PLACE.

CORN-HARVESTER.

SPECIFICATION forming part of Letters Patent No. 482,186, dated September 6, 1892.

Application filed January 2, 1892. Serial No. 416,873. (No model.)

*To all whom it may concern:*

Be it known that I, HAMON MORRISON, a citizen of the United States, and a resident of Morantown, in the county of Allen and State of Kansas, have invented certain new and useful Improvements in Corn-Harvesters; and I do hereby declare that the following is a full, clear, and exact description of the invention, which will enable others skilled in the art to which it appertains to make and use the same, reference being had to the accompanying drawings, which form a part of this specification.

My invention relates to improvements in corn-harvesters, the object being to provide a machine of this character in which the standing corn is cut by a reciprocating cutter, then laid by means of a rotating reel in a curved receiver, from which it is carried and deposited by means of an elevator upon a rotatable binder-table provided with shocking and compressing devices, the shocks bound with wire or cord, and finally set in proper position from the machine.

The invention consists in the novel construction and combination of devices, hereinafter fully described and claimed.

In the accompanying drawings, Figure 1 is a perspective view of a machine constructed in accordance with my invention. Fig. 2 is a plan view of the same. Fig. 3 is a section on the line $x$ $x$, Fig. 2. Fig. 4 is a section on the line $y$ $y$, Fig. 2.

In the said drawings the reference-numeral 1 designates the axle or driving-shaft, and 2 and 3 the supporting and driving wheels. Upon this axle is mounted the frame consisting of the side pieces or bars 4 and bars 5 and cross-bars 6. The driving-wheel 3 is located about the center of the frame and is provided or formed on one side with beveled cogs 7, which mesh with a beveled pinion 8, mounted on a shaft 9, journaled in the front bar of the frame. This shaft at its outer end is provided with a crank 10, which is pivoted to a pitman 12, connected with a sickle or cutter-bar 13, having the cutters 14. This cutter-bar passes through and works in a slot 15 in a stationary plate 16, which serves to guide the corn to the sickle or cutter-bar.

Journaled in uprights 17, secured to the frame is a shaft 18, which carries a reel 19, consisting of a series of radial arms 20, arranged in pairs and the outer ends of each pair connected by means of angle-bars 21, each comprising a horizontal portion with inclined ends, which are secured to said radial arms. Secured to this shaft 18 is a sprocket-wheel 22, connected by means of sprocket-chain 23 with a similar wheel 24, secured to the inner end of the axle. The object of the reel 19 is to catch the stalks as they are severed by the cutters and lay them in a curved receiver 25, located at one side of the machine. At the inner side of this receiver 25 is located an inclined elevator consisting of the side bars 26, connected together by means of cross-bars 27. The lower ends of the side bars 26, which terminate just below the receiver, are formed with slots 29, which embrace the shaft 30, journaled in the side bars 4 of the machine, which is provided with a series of sprocket-wheels 31, connected by means of sprocket-chains 32 with similar sprocket-wheels 33, secured to a shaft 34, journaled in slots 34$^a$ in the upper ends of the bars 26. These sprocket-chains are provided with projecting fingers, which catch the stalks in the receiver as said belts are actuated and carry the same to the binder-table, the inner part of said receiver being formed with slots for the passage of said fingers.

Upon the rear end of shaft 34 is provided a sprocket-wheel 36, connected by means of sprocket-chains 37 with sprocket 38 on shaft 30, and sprocket 39 on a shaft 40, journaled in the rear side bar of the machine-frame. The inner end of shaft 40 is provided with a beveled pinion 41, which meshes with the cogs 7 on the driving-wheel 4. The rear side bar is also provided with an inclined arm 42, having slotted upper end 53, which engages with shaft 34.

The elevator is provided with a bottom 43, and the side bars thereof, at or near the center, are provided with outward-projecting pins or projections 44, which engage in slots 45 in the upper ends of the standards 46, secured to the side bars 4 of the frame, and form supports for the elevator. The lower end of the elevator may be connected with the main frame in any ordinary or usual manner.

At the end of the machine opposite the receiver is located a circular or annular rotatable binder-table 47, having a central aperture, through which passes a pivot-pin 48, secured to one of the cross-bars 6. The frame is also provided with a segmental track 49, upon which run wheels 50, journaled in the under side of the table. This table is made in two parts hinged together, the smaller part 47ª having secured to it on its upper side a lever 51, which extends over to near the opposite edge of the table, where it is provided with a pivoted catch 52, by turning which in one direction or the other the said lever is locked or released, said catch acting in a manner similar to an ordinary turn-button. By means of the lever the portion 47ª can be lowered so as to drop a shock or bundle, as will hereinafter more fully appear. The upper side of the table 47 is provided with a series of oppositely-arranged curved upwardly-projecting arms or jaws 53 and 53ª, which receive the stalks as they come from the elevator. The arms 53 are provided with a rotatable shaft 54, having a crank 55 at one end.

The numeral 55ª denotes a spool attached to the table 47, carrying the binding wire or cord.

The numeral 56 designates a staple, through which passes a compressor rope or cord 57, secured at one end to the shaft 54 and the other end adapted to be tied or otherwise secured to one of the arms 53.

The numeral 58 denotes a vertical rod connected at its lower end with the tongue and at its upper end connected with a horizontal rod 59, passing through an aperture in an upright 60, and at its rear end connected with a vertical rod 61, secured to the bar 6, thus forming a support for the tongue.

The operation is as follows: The compressor-cord is laid upon the table, passing through the staple underneath the lever 51, and a sufficient quantity of wire or cord from the spool is laid on the table above said lever, as seen in Fig. 1, when the machine is ready for work. As the machine is pulled across the field the cutters 14 and plate 16 will sever or cut the stalks, which will be laid in the receiver by means of the rotating reel. The fingers on the sprocket-chains 32 will now seize the stalks and carry them to the top of the elevator, from which they will fall and be deposited between the curved arms 53 and 53ª. When a sufficient number of stalks has been accumulated between said jaws to form a shock or bundle of suitable size, the machine is stopped, the table is turned a quarter-revolution, and the compressor cord or rope is carried up and around the said stalks and connected with one of the arms 53 by tying or otherwise. The object in turning the table a quarter-revolution is to bring the arm 53ª from underneath the conveyer to allow the operator to more readily carry the compressor-cord around the bundle or gavel and secure the same to the arm 53. The shaft 54 is then turned or rotated by means of the crank 55, tightly compressing the shock or bundle. The binding wire or cord is then cut and brought around the bundle and its ends secured in any suitable manner, when the compressor-cord is released. The table is then returned to normal position and the dropper 47ª depressed by means of lever 51, which will allow the bound bundle or shock to set in proper position. The dropper is then raised and the lever secured by means of catch 52, when the machine is again ready to proceed with its work.

Having thus described my invention, what I claim is—

1. In a corn-harvesting machine, the combination, with the elevator, of the binder-table located underneath the upper end thereof, the upwardly-extending curved arms or jaws secured to said table, the shaft journaled in said jaws, and a compressor cord or rope secured to said shaft, substantially as described.

2. In a corn-harvesting machine, the combination, with the elevator, of the binder-table made in two parts hinged together, the lever secured to one of said parts, the upwardly-extending curved arms or jaws, the shaft journaled therein, and a compressor cord or rope secured to said shaft, substantially as described.

3. In a corn-harvesting machine, the combination, with the elevator, of the rotatable binder-table made in two parts hinged together, the lever secured to one of said parts, the upwardly-extending curved arms or jaws, the shaft journaled therein, the staple secured to the said table, and the compressor cord or rope, substantially as described.

In testimony that I claim the foregoing as my own I have hereunto affixed my signature in presence of two witnesses.

HAMON MORRISON.

Witnesses:
G. W. CAMPBELL,
J. H. VAUGHN.